April 6, 1948.　　　　R. D. BEAN　　　　2,439,331
WARNING SIGNAL SYSTEM FOR REFRIGERATORS
Filed Jan. 12, 1946
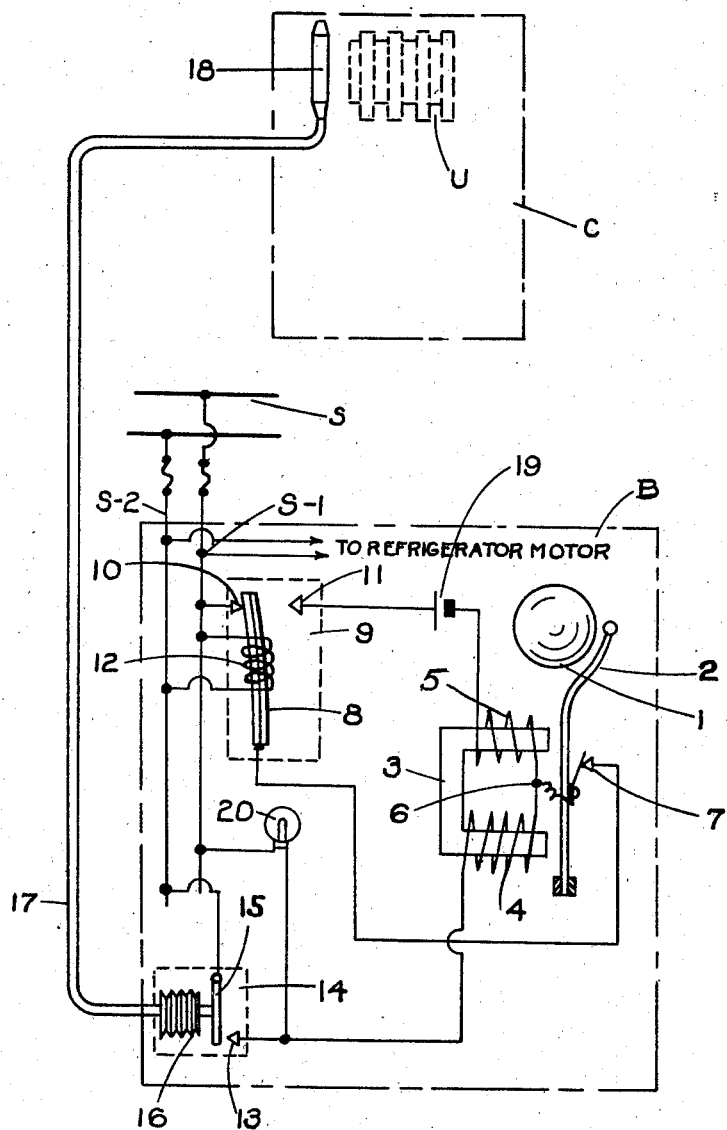
INVENTOR:
Roscoe D. Bean
BY Owen W. Kennedy
ATTORNEY Patented Apr. 6, 1948

2,439,331

UNITED STATES PATENT OFFICE 2,439,331

WARNING SIGNAL SYSTEM FOR REFRIGERATORS

Roscoe D. Bean, Red Bank, N. J., assignor to Signal Engineering & Manufacturing Company, New York, N. Y., a corporation of Massachusetts Application January 12, 1946, Serial No. 640,737

4 Claims. (Cl. 177—311)

The present invention relates to a warning signal system adapted for use in connection with refrigerators and similar cooling equipment for giving warning of any temperature rise beyond a predetermined limit within a refrigerating chamber, due to failure of the refrigerating apparatus, or to call attention to failure of the electrical power supplying such apparatus.

When domestic or commercial refrigerators and freezers such as are widely used for the storage of foods get out of order, so that the temperature in the food storage compartment rises above an allowable maximum, there is likely to be a costly spoilage of food unless the failure of refrigeration is promptly discovered. For this reason, various visual or audible signal devices have been heretofore employed, the actuation of which is automatically responsive to a rise in temperature within the refrigerating compartment above a predetermined maximum.

Owing to the fact that a considerable period of time must elapse between the failure of refrigeration and the rise of temperature within the refrigerating compartment to the point where a temperature responsive signal will be operated, considerable food spoilage may result before the trouble can be remedied. Furthermore, failure of a refrigerating unit to function is just as liable to be caused by a discontinuance of the electrical power supplying the driving motor of the unit, as by mechanical trouble within the unit itself. Therefore, when the temperature of the refrigerating compartment is alone depended upon to actuate a warning signal, a considerable time must elapse before the signal is operated, irrespective of the particular cause for the failure of the refrigerating apparatus to function normally.

According to the present invention, there is provided an improved warning signal and system for use in connection with refrigerators and food freezers of all types, characterized by the fact that the signal will be actuated in response to either a failure of the apparatus itself, or a failure of the electrical power supply for the driving motor. As a result of the selective functioning of the signal under conditions later described, any failure of the electrical power supply either at its source, or by blowing a fuse, or resulting from accidental disconnection of the conductor supplying power, will be called to attention promptly and well in advance of any appreciable rise of temperature within the refrigerating compartment, such as would be required before the signal would be subsequently operated in response to a mechanical failure of the apparatus. By reason of this preliminary warning well in advance of a rise of temperature within the compartment, steps may be taken to restore the power supply before any food spoilage can take place.

The above and other advantageous features of the invention will hereinafter more fully appear from the following description considered in connection with the accompanying drawing, which is a schematic diagram, showing the electrical connections for operating the warning signal, in association with refrigeration apparatus.

Referring to the drawing, there is shown in dot and dash lines the outline of the refrigerating compartment C of a conventional refrigerator, within which is located a cooling unit U that is adapted normally to maintain the compartment C at a reduced temperature best suited for the preservation or freezing of food. A refrigerant is supplied to the cooling unit U by any suitable refrigerating mechanism, which usually consists of a driving motor, not shown, mounted on a base B, with the refrigerating mechanism on the base B having any desired relation to the compartment C, and being accessible to the supply mains S—1 and S—2 of an electrical power source S.

The warning system comprises a signal 1, shown for purposes of illustration as being an audible signal of the vibrating bell type, wherein a striker 2 is adapted to be moved intermittently with respect to a magnetic core 3 in response to energization of either one of two windings 4 and 5. The windings 4 and 5 are connected at a common point 6 to the striker 2, which normally bears on a stationary contact 7, so that energization of either winding 4 or 5, through circuits later described, will cause operation of the signal 1 as a vibrating bell, due to intermittent making and breaking of the winding circuits at the contact 7.

The interrupter contact 7 is connected to an arm 8 of a selective supervisory switch 9, the arm 8 being adapted to engage one or the other of spaced stationary contacts 10 and 11. As shown, the arm 8 is of the bi-metal type, and when in a heated condition, is biased, to the left to engage the contact 10 that is connected to one supply main S—1 of the electrical power source S.

For the purpose of maintaining the arm 8 in a heated condition, so as to normally engage the contact 10, the arm 8 is surrounded by a heater coil 12, the terminals of which are connected across both mains S—1 and S—2 of the power source S. Therefore, so long as continuity of the power source S is maintained, the arm 8 will engage the stationary contact 10 to establish a circuit from one side of the source to one terminal of the winding 4 through the then closed interrupter contact 7.

The other terminal of the winding 4 is connected to one contact 13 of an automatic switch 14, the operation of which is responsive to the temperature in the cooling compartment C. The switch 14 may be of any desired construction and, as shown, comprises a contact arm 15 connected to the supply main S—2, and movable relative to contact 13, which may be adjustable. The arm 15 is normally maintained out of engagement with the contact 13 by means of an expansible diaphragm 16, that is connected by a tube 17 to the bulb 18 of a temperature responsive device located in the compartment C, with the assembly represented by the diaphragm 16, tube 17 and bulb 18 containing a fluid or gas, as is usual in such devices.

While the temperature in the compartment C remains in the desired range suitable for refrigerating or food freezing purposes, the diaphragm 16 maintains the switch arm 15 out of engagement with the contact 13, so that the circuit of the signal winding 4 remains open at the switch 14, so long as the refrigerating mechanism functions normally. However, should the temperature within the compartment C rise above a predetermined point from any cause, the resulting increase of fluid or gas pressure within the temperature responsive bulb 18 will cause the diaphragm 16 to move the arm 15 into engagement with the contact 13, thereby completing the circuit of the winding 4 and causing the signal 1 to give an audible indication of the fact that the refrigerating mechanism has failed to function.

Generally speaking, a considerable time interval must elapse between an actual failure of the refrigerating mechanism and the functioning of the switch 14 to energize the signal winding 4, due to the fact that the temperature within the compartment C will rise very gradually. This time lag is somewhat unpredictable, due to variable factors, such as the size of the refrigerating compartment C, the amount of food stored, and the outside room temperature, but under any conditions there will be a considerable time delay before a failure of the refrigerating mechanism itself is called to attention by operation of the signal 1 through the winding 4.

As previously pointed out, the time lag in the normal functioning of the temperature responsive switch 14 can under some conditions result in food spoilage particularly with food freezers, due to the fact that the refrigerator compartment will have reached a critical temperature before the signal 1 is operated through the winding 4. And such a condition may well develop even with the refrigerating apparatus operating normally, in the event that the apparatus stops, due to a failure of electrical power, rather than from some mechanical trouble.

For the purpose of promptly indicating any interruption of the electrical power supply to the refrigerator mechanism, the signal 1 provides the previously noted winding 5 mounted on the same magnetic core 3 as the winding 4. One terminal of this winding 5 is connected to the common point 6 leading to the interrupter contact 7 of the signal, while the other terminal thereof is connected to one side of an auxiliary source of power, such as a battery 19. The other side of the battery 19 is connected to the stationary contact 11 of the supervisory switch 9, which contact 11, as previously pointed out, is normally out of engagement with the bimetal arm 8 so long as this arm is biased to the left through being maintained in a heated condition by energization of the heating coil 12 from the source S. In other words, the circuit of the winding 5 of the signal 1 is normally maintained open at the contact 11, so long as the electrical power supply for the refrigerator is maintained across the mains S—1 and S—2.

Should there occur an interruption of the power supply of any considerable duration, as by blowing a fuse in the supply mains, or by accidental disconnection of the mains from the source S, the resulting deenergization of the coil 12 will cause the bi-metal arm to cool and move to the right until it engages the stationary contact 11. When this occurs, the circuit of the winding 5 will be completed through the battery 19, and the signal 1 will operate to call attention to the fact that there has been a sustained interruption of the electrical power supply.

Since the bi-metal arm 8 will start to cool immediately, following deenergization of the heating coil 12, the circuit of the winding 5 will be completed within a few minutes after the supply mains S—1 and S—2 are dead. For this reason, the interruption of the refrigeration effect due to power failure will be called to attention long before the temperature within the compartment C can rise to a point that would cause food spoilage. Assuming that the power interruption is of a temporary and accidental nature, such as blowing a fuse, or pulling out a conductor cord, the power can be restored and the refrigerating mechanism put back into operation before any appreciable rise of the temperature within chamber C has occurred. On the other hand, blowing of a fuse for the supply mains S—1 and S—2 may serve to call attention to overheating of the motor driving the refrigerating mechanism, due to overheating, or other abnormal conditions in the refrigerating unit that can be corrected in advance of any damaging rise in temperature in the compartment C.

Due to the fact that the bi-metal arm 8 is normally separated from the contact 11 by an appreciable distance and heats more rapidly than it cools, brief interruptions in the power supply originating at the central station will not result in operating the signal 1 through energization of the winding 5. Such central station interruptions are usually of relatively short duration measured in seconds, so that while the arm 8 might contract to the point of separating slightly from the contact 10, its movement would not be sufficient to engage the contact 11 and the arm 8 will quickly reengage contact 10 upon power resumption. Therefore, the winding 5 will operate the signal 1 only in response to a sustained interruption of the power supply caused by local conditions that more than likely can be remedied long before the temperature within the compartment C has risen to the point where food spoilage can occur.

From the foregoing, it is apparent that by the present invention there is provided an improved warning signal system for refrigerators and food freezers that will give timely warning of failure of the refrigerating apparatus itself, or failure of the electrical power source supplying such apparatus. In the functioning of the system, the signal 1 performs a dual function responsive to selective energization of its two windings from sources of different voltage. In order to enable a person hearing the signal to readily determine the nature of the trouble which has caused the signal to operate, a colored signal light 20 may be employed, so connected as to be illuminated from the supply mains S—1 and S—2 whenever the switch 14 is closed. Since this signal light 20 will not be operated from the battery 19, the illumination thereof, simultaneously with sounding of the signal 1, will indicate at once that the signal is functioning as a result of rise of temperature within the compartment C, so that immediate steps must be taken to remedy the trouble, if food spoilage is to be avoided.

I claim:

1. A warning signal system for refrigerators and the like comprising in combination, an electrically operated signal, separate sources of electrical power, a refrigerating device operable from one of said sources and providing a refrigerating chamber, means for operating said signal from the same power source as the refrigerating device, in response to a predetermined temperature rise within the chamber, and means responsive to failure of the first named source for a predetermined period to operate said signal from the other source.

2. A warning signal system for refrigerators comprising in combination, a first source of electrical power, a refrigerating device operable from said first source of electrical power, a second source of electrical power, an electrically operated signal, means connected in circuit with one of said power sources for energizing said signal in response to a predetermined temperature rise within said refrigerating device, a heating coil connected in circuit with said first power source, and a heat-responsive element associated with said heating coil and adapted upon a failure of said first power source for a predetermined time interval to energize said signal from said second power source, which time interval is less than the time required for a predetermined temperature rise in said refrigerating device to operate said first named signal-operating means, following a failure of said refrigerating device.

3. A warning signal system for refrigerators comprising, a first source of electrical power, a refrigerating device operable from said first power source, a second source of electrical power, an electrically operated signal, a heating coil connected in circuit with said first power source, a heat-responsive element associated with said heating coil, an electrical contact, said element, said signal, and said contact all being connected in a normally open circuit with said second power source, said element being responsive to failure of said first power source for a predetermined period to engage said contact thereby to energize said signal from said second source of power, a normally open circuit-closing means connecting said signal in circuit with one of said power sources, and means for closing said circuit-closing means in response to a predetermined temperature rise within said refrigerating device thereby to energize said signal.

4. A warning signal system for refrigerators comprising, a first source of electrical power, a refrigerating device operable from said first power source, a second source of electrical power, an electrically operated signal having separate operating windings of which a first one is connected in circuit with said second power source, a heating coil connected in circuit with said first power source, a pair of electrical contacts each being associated with a respective one of said power sources, a heat-responsive element associated with said heating coil and adapted to engage that contact which is associated with said first power source whenever said coil is energized, means normally to connect said element in circuit with both of said windings, said element being responsive to failure of said first power source for a predetermined period to engage that contact which is associated with said second power source thereby to energize said signal, a normally open circuit-closing means connecting in circuit through said heat-responsive element said first power source and a second one of said windings, and means for closing said circuit-closing means in response to a predetermined temperature rise within said refrigerating device thereby to energize said signal.

ROSCOE D. BEAN.

REFERENCES CITED

The following references are of record in the file of this patent:

UNITED STATES PATENTS

| Number | Name | Date |
| --- | --- | --- |
| 2,092,085 | Riley | Sept. 7, 1937 |
| 2,368,471 | Horan | Jan. 30, 1945 |

FOREIGN PATENTS

| Number | Country | Date |
| --- | --- | --- |
| 507,300 | Great Britain | June 13, 1939 |
| 521,582 | Great Britain | May 24, 1940 |